(12) United States Patent
Ooishi et al.

(10) Patent No.: US 8,446,356 B2
(45) Date of Patent: May 21, 2013

(54) DISPLAY DEVICE

(75) Inventors: Yoshihisa Ooishi, Yokohama (JP); Junichi Maruyama, Yokohama (JP); Takashi Shoji, Yokohama (JP); Kikuo Ono, Mobara (JP); Masahiro Fukata, Yokohama (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 867 days.

(21) Appl. No.: 12/572,383

(22) Filed: Oct. 2, 2009

(65) Prior Publication Data

US 2010/0085477 A1 Apr. 8, 2010

(30) Foreign Application Priority Data

Oct. 3, 2008 (JP) ................................. 2008-258041

(51) Int. Cl.
*G09G 3/36* (2006.01)
(52) U.S. Cl.
USPC ............. 345/102; 345/204; 345/77; 345/214; 362/97.2
(58) Field of Classification Search
USPC ................. 345/89, 102, 204, 690, 77, 76, 82, 345/84, 214; 362/97.1–97.4
See application file for complete search history.

(56) References Cited

U.S. PATENT DOCUMENTS

| 7,310,118 | B2 | 12/2007 | Kamimura |  |
|---|---|---|---|---|
| 8,139,021 | B2* | 3/2012 | Botzas et al. | 345/102 |
| 2005/0140626 | A1* | 6/2005 | Doyen et al. | 345/89 |
| 2005/0184949 | A1 | 8/2005 | Kamimura |  |
| 2006/0256141 | A1 | 11/2006 | Maruyama et al. |  |
| 2006/0267904 | A1* | 11/2006 | Aiba | 345/98 |
| 2008/0068359 | A1* | 3/2008 | Yoshida et al. | 345/204 |
| 2008/0074372 | A1* | 3/2008 | Baba et al. | 345/89 |
| 2008/0284768 | A1* | 11/2008 | Yoshida et al. | 345/208 |
| 2008/0284929 | A1* | 11/2008 | Kimura | 349/38 |
| 2009/0167673 | A1* | 7/2009 | Kerofsky | 345/102 |

FOREIGN PATENT DOCUMENTS

| JP | 2005-241787 | 9/2005 |
|---|---|---|
| JP | 2006-343706 | 12/2006 |
| JP | 2008-076755 | 4/2008 |
| WO | WO 2006/121188 | 11/2006 |

OTHER PUBLICATIONS

"Moving Picture Quality Improvement for Hold-Type AM-LCDs", Society for Information Display Symposium Digest of Technical Papers, vol. 32, Issue 1, pp. 986-989, Taiichiro Kurita.

* cited by examiner

*Primary Examiner* — Lun-Yi Lao
*Assistant Examiner* — Kelly B Hegarty
(74) *Attorney, Agent, or Firm* — Antonelli, Terry, Stout & Kraus, LLP.

(57) ABSTRACT

The display device including: a display panel; a backlight; a memory for converting frame rate of an input video signal and outputting a video signal; an interpolation frame generation unit for generating an interpolation frame based on the video signal output from the memory; a histogram generator for generating a histogram based on the input video signal; and a backlight brightness calculation unit for calculating a backlight control signal, the display device further comprising: wherein image data for display, which is obtained by an N-th frame of the input video signal, and image data of the interpolation frame generated based on the N-th frame and an (N+1)-th frame of the input video signal, is input to the display panel; and wherein the backlight control signal calculated based on the histogram generated based on the image data of the N-th frame is used for displaying the image data for display.

12 Claims, 8 Drawing Sheets

DISPLAY DEVICE

CROSS-REFERENCE TO RELATED APPLICATION

The present application claims priority from Japanese application JP 2008-258041 filed on Oct. 3, 2008, the content of which is hereby incorporated by reference into this application.

BACKGROUND OF THE INVENTION

1. Field of the Invention

The present invention relates to a display device and a driving method therefor. More particularly, the present invention relates to a display device for performing display by synchronizing a video signal with light source brightness control in controlling brightness of a light source according to the video signal.

2. Description of the Related Art

In recent years, non-emissive display devices as typified by liquid crystal display devices have been in widespread use. The non-emissive display device uses a light source and a light modulation device for adjusting the amount of light to be transmitted from the light source. The non-emissive display device has such disadvantages that the light source consumes power and that light leakage from the light source during the black display causes deteriorated contrast. In view of this, in order to make improvement in power consumption and contrast, there have been proposed a plurality of methods of controlling light source brightness according to video signals. As one example of such methods, JP 2008-076755 A proposes an image display device for controlling the light source brightness according to a histogram in which, for each predetermined gray-scale level, gray-scale levels representing the respective level-ranges in an input image are associated with frequencies of pixels included in the respective level-ranges.

Further, in general, the liquid crystal display device is a hold-type display device in which a rendered image is held until an image of the next frame is rendered, instead of an impulse-type display device, such as a display device using a cathode ray tube (CRT), in which strong light is emitted at the moment when an image is rendered. One of the drawbacks of the hold-type display device is so-called motion blur, in which an edge portion of a moving object becomes blurred when a moving picture is displayed. This motion blur is caused by so-called retinal persistence of vision, which occurs when a viewer moves his/her direction of sight along with the movement of an object, interpolating display images before and after the movement with regard to a display image for which the brightness is held. As a solution to such motion blur, a method of making the hold-type display device operate more like the impulse-type display device is known to be effective, such as updating display images with higher frequencies or temporarily canceling the retinal persistence of vision with insertion of a black screen (see "Moving Picture Quality Improvement for Hold-type AM-LCDs", Taiichiro kurita, SID 01 DIGEST).

As one example of the methods for solving the motion blur, JP 2005-241787 A discloses a system (interpolation frame inserting system) in which an intermediate frame of two adjacent frames is generated as an interpolation frame based on the two adjacent frames, the interpolation frame thus generated is inserted between the two adjacent frames, and a video signal into which the interpolation frame is inserted is output with a higher frame frequency than the frame frequency of the original video signal.

As another example of the methods for solving the motion blur, JP 2006-343706 A discloses a system (light-dark field dividing system) in which a one-frame interval is divided into two field intervals for a light field and a dark field, display of the original video signal is performed using the two fields in a simulated manner, and the retinal persistence of vision is canceled by the dark field.

In both the interpolation frame inserting system and the light-dark field dividing system described above, the frame frequency of the video signal to be output needs to be converted into a higher frame frequency than the frame frequency of the input video signal (frame rate conversion). When the frame rate conversion is performed, a frame memory is used to temporarily hold the video signal.

Description is given of a problem posed when the brightness of the light source is controlled according to the video signal. FIG. 1A is a diagram for describing a schematic configuration of a liquid crystal display device related to a display device of the present invention. In particular, FIG. 1A is one example of a block configuration diagram of a display device including a mechanism for controlling light source brightness according to the video signal. The display device illustrated in FIG. 1A includes a display image data correction unit 108, a histogram generator 106, a backlight brightness calculation unit 107, and an image display unit 109. The image display unit 109 includes a liquid crystal panel 110 serving as a light modulation device and a backlight 111 provided behind the liquid crystal panel, which serves as a light source unit. Specifically, in the liquid crystal display device illustrated in FIG. 1A, the mechanism for controlling the light source brightness is independent of other video processing circuits, and also, an output signal from another video processing circuits is used as a video signal 102 to be input to the mechanism.

Next, by taking a case in which the video signal is input to the block configuration diagram illustrated in FIG. 1A at timing illustrated in a timing chart of FIG. 1B, focus is given to image data D0 corresponding to one frame of the video signal 102, and a problem therewith is described. For example, in a case of a high-definition TV format of 1,920 dots×1,080 lines with each color of RGB having 8 bits (total of 24 bits), the image data corresponding to one frame represents data constructed of 1,920×1,080×24 bits. The image data D0 is input to the histogram generator 106 and the display image data correction unit 108. The histogram generator 106 generates a histogram 104 showing a feature amount of the image data D0, which is used by the backlight brightness calculation unit 107 as an indicator in calculating backlight brightness based on the image data D0. When the histogram 104 is generated based on image data corresponding to one frame, as illustrated in the timing chart of FIG. 1B, data HG0, which is the histogram 104 of the image data D0, is generated with a delay of a one-frame interval T, compared to the image data D0. The histogram 104 generated as the data HG0 is output to the backlight brightness calculation unit 107. The backlight brightness calculation unit 107 uses the data HG0, which is the histogram 104 obtained by the histogram generator 106, to calculate light emission brightness of the backlight, and then outputs data BL0 serving as a backlight control signal 105 to the display image data correction unit 108 and the backlight 111. Here, focus is given to timings at which the image data and the backlight control signal 105 are input to the display image data correction unit 108. There occurs a time lag of the one-frame interval T between the timing at which the image data D0 is input to the display image data correction unit 108 and the timing at which the data BL0 is input to the display image data correction unit 108. Here, the data BL0 is the backlight control signal 105 obtained based on the data HG0, which is the histogram 104 generated based on the image data D0. As a result, there occurs a problem that the display image data correction unit 108 corrects the image data D1 by using the data BL0, which is the backlight control signal 105 obtained based on the image data D0, and then generates data D1' serving as display image data 103.

As a method for solving this problem, JP 2008-076755 A proposes a method of using a frame memory. FIG. 2A is an exemplary block configuration diagram of a liquid crystal display device obtained by applying the method of using a frame memory to the liquid crystal display device illustrated in FIG. 1A. A frame memory 203 delays the image data D0 by the one-frame interval T, to thereby synchronize the image data D0 to be input to the display image data correction unit 108 with the data BL0, which is the backlight control signal 105 obtained based on the image data D0, before the image data D0 and the data BL0 are input to the display image data correction unit 108. Therefore, the display image data correction unit 108 can correct the image data D0 by using the data BL0, which is the backlight control signal 105 obtained based on the image data D0. However, in order to synchronize the image data with the backlight control signal 105, a frame memory is required, which prevents reduction in cost of the display device.

SUMMARY OF THE INVENTION

In order to solve the above-mentioned problems, the present invention has been made, and it is an object thereof to provide a display device capable of synchronizing image data with a backlight control signal while preventing such a circuit as a frame memory from increasing.

In order to solve the above-mentioned problems, the present invention provides a display device including: a display panel serving as a light modulation device; a backlight provided behind the display panel, for emitting irradiation light; a memory for frame rate conversion for outputting a video signal, which is subjected to frame rate conversion, with a higher frequency than a frequency of an input video signal input from an external system; an interpolation frame generation unit for generating an interpolation frame based on the video signal which is subjected to the frame rate conversion, and outputting a video signal into which the interpolation frame is inserted; a histogram generator for generating a histogram based on the input video signal; and a backlight brightness calculation unit for calculating a backlight control signal for adjusting brightness of the backlight based on the histogram, the display device further comprising: wherein image data for display is input to the display panel, wherein the backlight control signal is input to the backlight, wherein the image data for display is obtained by subjecting image data of an N-th frame of the input video signal to the frame rate conversion, and image data of the interpolation frame generated based on the image data of the N-th frame and image data of an (N+1)-th frame of the input video signal, where N represents a natural number including zero; and wherein the backlight control signal calculated based on the histogram generated based on the image data of the N-th frame is used for displaying the image data for display.

In order to solve the above-mentioned problems, the present invention also provides a display device including: a display panel serving as a light modulation device; a backlight provided behind the display panel, for emitting irradiation light; a memory for frame rate conversion for outputting a video signal, which is subjected to frame rate conversion, with a higher frequency than a frequency of an input video signal input from an external system; a light-dark field generation unit for generating a light field and a dark field based on the video signal which is subjected to the frame rate conversion, and outputting a video signal containing the light field and the dark field; a histogram generator for generating a histogram based on the input video signal; and a backlight brightness calculation unit for calculating a backlight control signal for adjusting brightness of the backlight based on the histogram, the display device further comprising: wherein image data for display is input to the display panel, wherein the backlight control signal is input to the backlight, wherein the image data for display is obtained by image data of the dark field generated based on image data of an N-th frame of the input video signal, and image data of the light field generated based on image data of an (N+1)-th frame of the input video signal; and wherein the backlight control signal calculated based on the histogram generated based on the image data of the N-th frame is used for displaying the image data for display.

In order to solve the above-mentioned problems, the present invention also provides a display device for performing display with gray scale and brightness according to image data input from an external system, the display device including: a display panel including a plurality of pixels arranged in matrix; a backlight for emitting irradiation light to a back side of the display panel; a memory for storing the image data corresponding to at least one frame, which is input from the external system; a generation unit for generating image data having a different value from the image data; and a light emission amount calculation unit for calculating a light emission amount of the backlight based on the image data, wherein: the image data is written into the memory once during a one-frame interval, and the image data is read out from the memory twice with a delay of at least half a length of the one-frame interval after the image data is written; the generation unit uses first image data read out from the memory for a first time and second image data read out from the memory for a second time, to generate first image data for display and second image data for display corresponding to the first image data and the second image data, respectively; the light emission amount calculation unit calculates the light emission amount of the backlight based on the image data input from the external system; and displaying of the first image data for display and the second image data for display on the display panel and irradiation made by the backlight with the calculated light emission amount are performed in synchronization with a frame interval of the image data input from the external system.

According to the present invention, it is possible to provide the display device in which the image data and the backlight control signal are synchronized with each other while preventing such a circuit as a frame memory from increasing.

Other effects of the present invention will become apparent from the following description.

DETAILED DESCRIPTION OF THE INVENTION

Figure 1A:
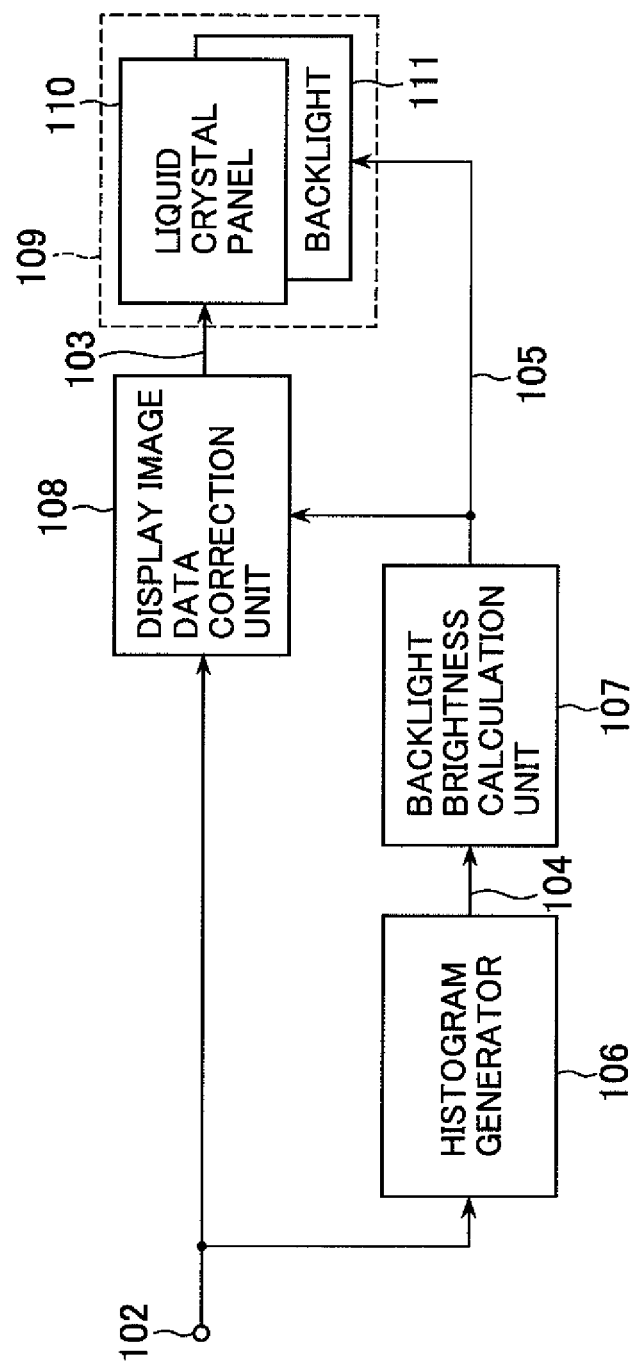
FIG. 1A is a diagram for describing a schematic configuration of a liquid crystal display device relevant to a display device of the present invention.
Figure 1B:
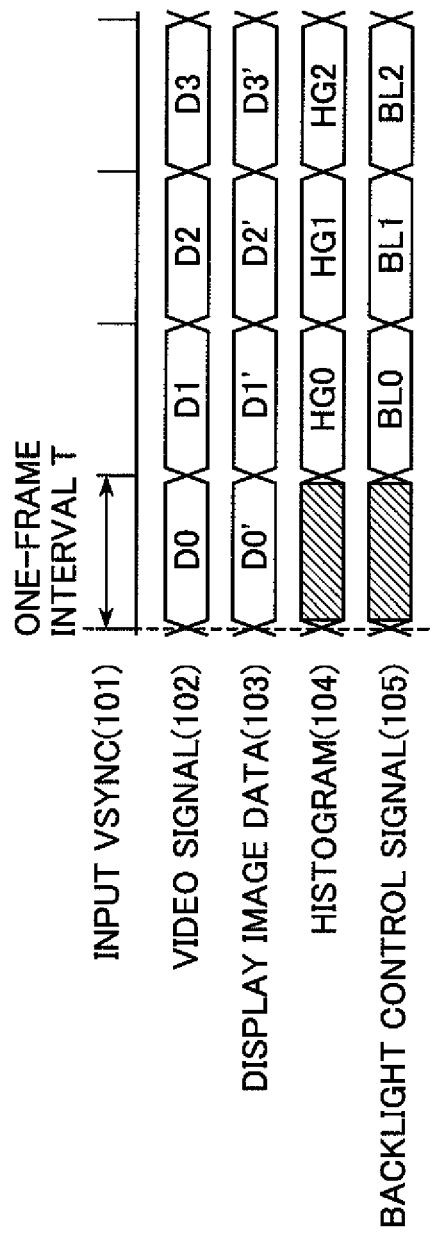
FIG. 1B is an operation chart for describing operation of the liquid crystal display device relevant to the display device of the present invention.
Figure 2A:
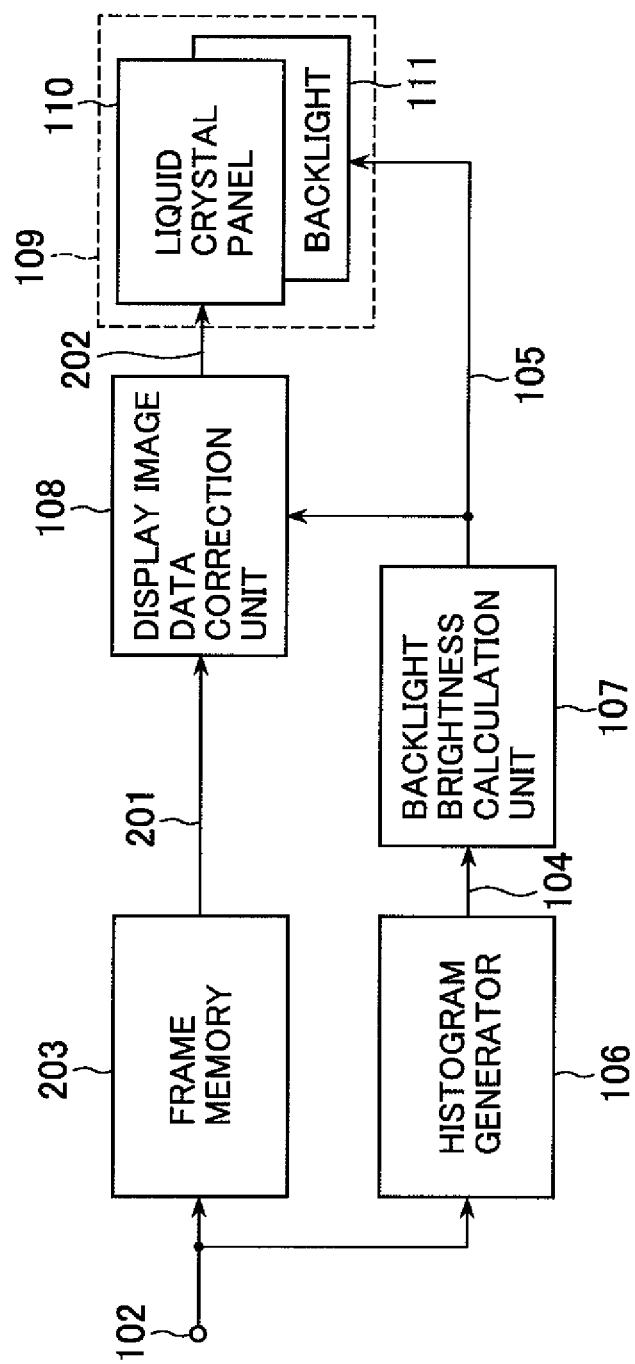
FIG. 2A is a diagram for describing a schematic configuration in which a frame memory is employed for the liquid crystal display device relevant to the display device of the present invention.
Figure 2B:
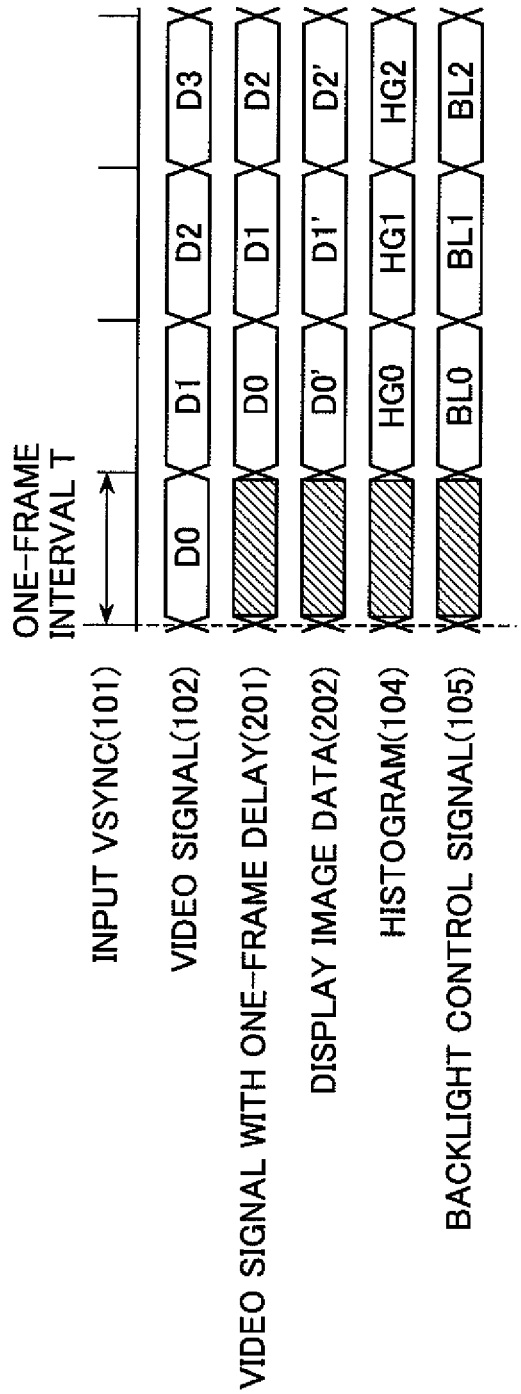
FIG. 2B is an operation chart for describing operation of the liquid crystal display device relevant to the display device of the present invention.

Hereinbelow, with reference to the drawings, description is given of a display device according to embodiments of the present invention. It should be noted that, in the following description, like reference numerals and symbols refer to like components to avoid repetitive description.

[First Embodiment]

Figure 3A:
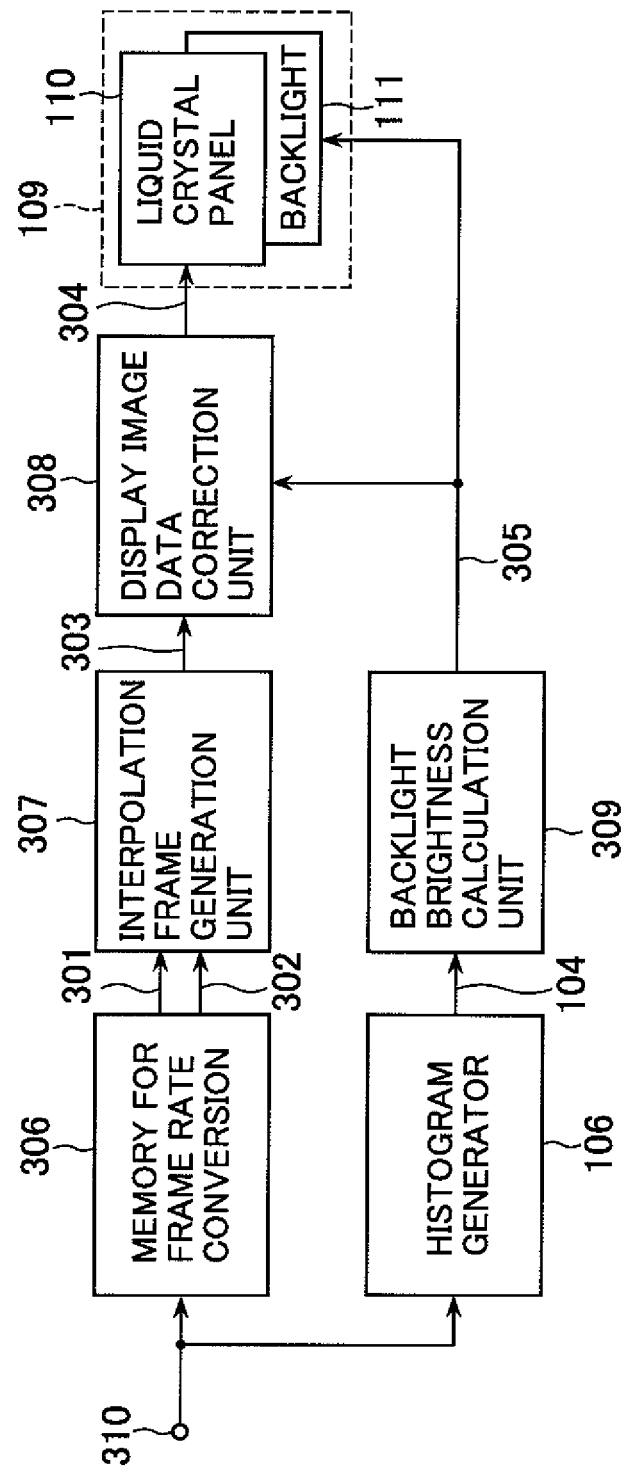
FIG. 3A is a diagram for describing a schematic configuration of a liquid crystal display device, which is one example of a display device according to a first embodiment of the present invention.
Figure 3B:
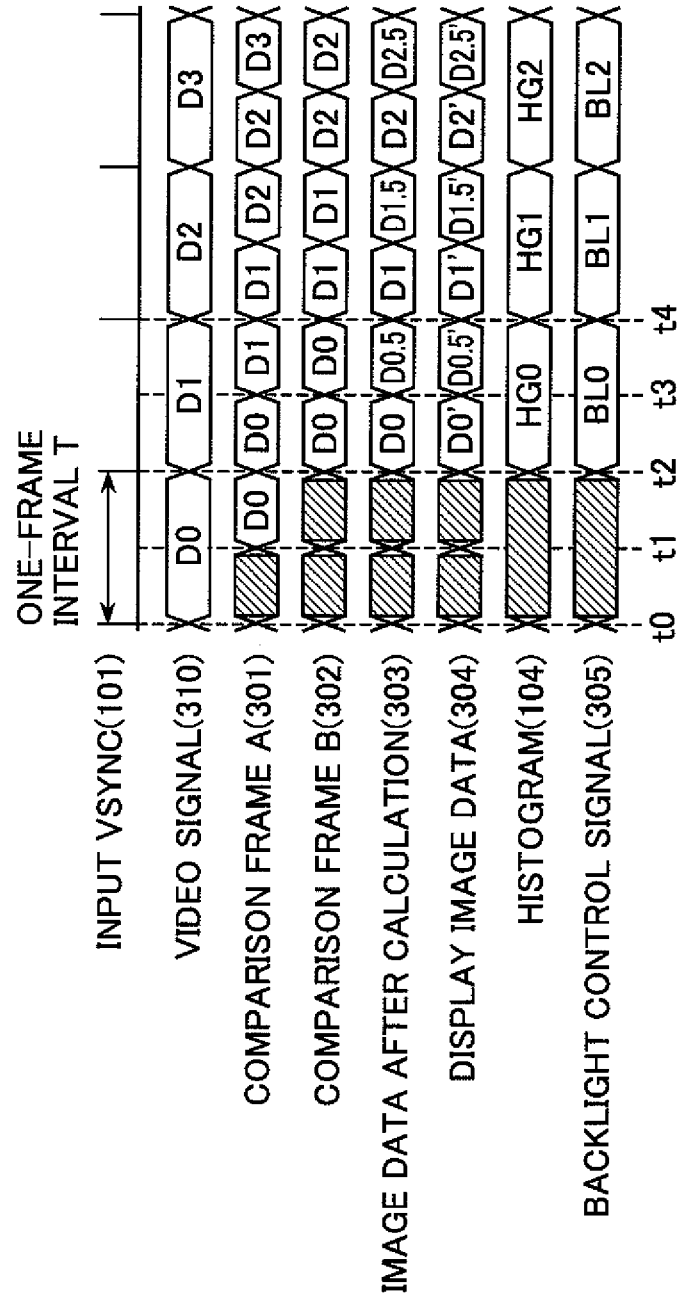
FIG. 3B is an operation chart for describing operation of the liquid crystal display device according to the first embodiment of the present invention.

FIG. 3A is a diagram for describing a schematic configuration of a liquid crystal display device, which is one example of the display device according to a first embodiment of the present invention. In particular, FIG. 3A is a block configuration diagram for describing the schematic configuration of the liquid crystal display device according to the first embodiment of the present invention, whereas FIG. 3B is an operation chart for describing operation of the liquid crystal display device according to the first embodiment of the present invention. The liquid crystal display device according to the first embodiment, which is illustrated in FIG. 3A, is a liquid crystal display device that employs an interpolation frame inserting system and a backlight brightness modulating system. It should be noted that, herein, N represents a natural number including zero.

As illustrated in FIG. 3A, the liquid crystal display device according to the first embodiment of the present invention includes a memory for frame rate conversion 306, an interpolation frame generation unit 307, a display image data correction unit 308, a histogram generator 106, a backlight brightness calculation unit 309, and an image display unit 109. Further, the image display unit 109 includes a liquid crystal panel (display panel) 110 serving as a light modulation device and a backlight 111 provided behind the liquid crystal panel, which serves as a light source unit.

In FIG. 3A, the memory for frame rate conversion 306 includes a frame memory having a memory capacity for at least one frame. The frame memory may be constructed by any one of an SDRAM, a DRAM, a RAM, a FIFO, and the like, which are all well known. Further, the memory for frame rate conversion 306 of the first embodiment outputs a video signal (image data), which is stored in the frame memory, as a comparison frame A 301 and a comparison frame B 302 with a higher frame frequency than the frame frequency used when a video signal 310 is input. In the memory for frame rate conversion 306 of the first embodiment, the frame frequency used when the video signal 310 is input is 60 Hz, and the frame frequencies of the comparison frame A 301 and the comparison frame B 302 are 120 Hz.

The interpolation frame generation unit 307 includes a well-known intermediate value detection circuit. For example, the intermediate value detection circuit calculates, for each pixel, an intermediate value between image data of an N-th frame input based on the comparison frame A 301 and image data of an (N+1)-th frame input based on the comparison frame B 302. Specifically, for each pair of two image data inputs (comparison frame A 301 and comparison frame B 302) that are sequentially input, the interpolation frame generation unit 307 of the first embodiment adds values of the respective pixels (pixel values) together on a pixel basis, and then divides the sum by two, which represents the number of added elements, to thereby obtain the intermediate value. The intermediate value thus obtained is output as image data after calculation 303 for an interpolation frame. Here, the image data is input to the interpolation frame generation unit 307 with an interval of half the length of one frame (=T/2), and hence an output interval of the interpolation frame corresponding thereto is also half the length of a one-frame interval (T/2). Further, the method of generating an interpolation frame by the interpolation frame generation unit 307 is not limited to the use of the intermediate value obtained by the intermediate value detection circuit. For example, a well-known motion vector detection circuit employing a matching method may also be used as the method of generating an interpolation frame. Various modifications may be made without departing from the spirit and scope of the present invention.

The histogram generator 106 is a circuit for generating an indicator to be used for calculating backlight brightness based on the video signal 310 input from an external system (not shown). Based on the image data input as the video signal 310 from the external system, the histogram generator 106 of the first embodiment generates a histogram showing a feature amount of the image data, and then outputs the obtained histogram. On this occasion, because a histogram is generated based on image data corresponding to one frame, the histogram generator 106 of the first embodiment requires a period of time corresponding to one frame for generating a histogram after input of the image data. In other words, after the input of the image data, a histogram corresponding to that image data is obtained with a delay of a one-frame interval.

The backlight brightness calculation unit 309 is a circuit for: calculating a backlight control signal 305 for controlling brightness of the backlight 111 based on the histogram; controlling a driver circuit (not shown) for the backlight 111 based on the obtained backlight control signal 305; and causing the backlight 111 to emit light with a desired brightness. It should be noted that the backlight brightness calculation unit 309 of the first embodiment calculates the backlight control signal 305 substantially in real time with input of a histogram 104.

The display image data correction unit 308 is a circuit for generating image data in consideration of the brightness of the backlight 111 based on the image data after calculation 303 and the backlight control signal 305. Specifically, in a case where an image is bright across the entire screen, the backlight brightness calculation unit 309 causes the backlight 111 to emit backlight with increased brightness based on the histogram. However, in a case where the entire screen is relatively dark, the backlight brightness calculation unit 309 causes the backlight 111 to emit backlight with decreased brightness. Meanwhile, the image data after calculation 303 to be output from the interpolation frame generation unit 307 is such image data that is obtained assuming a case in which the backlight is ON with the highest brightness. For this reason, simply decreasing light emission brightness of the backlight 111 causes an insufficient amount of light of the backlight 111 passing through the liquid crystal panel 110, which results in darker screen display than desired screen display. Accordingly, the display image data correction unit 308 converts the input image data after calculation 303 into display image data 304 according to the amount of light of the backlight 111, and then outputs, as display data, the obtained display image data 304 (image data for display) to a liquid crystal driver circuit (not shown) of the liquid crystal panel 110.

Next, with reference to the operation chart illustrated in FIG. 3B, description is given of the operation of the liquid crystal display device according to the first embodiment. Here, in the following description, pieces of image data each corresponding to one frame of the video signal 310 are respectively denoted by image data D0, D1, D2, . . . . Accordingly, image data of an N-th frame is denoted by DN, and image data of the next frame, that is, image data of an (N+1)-th frame, is denoted by DN+1. Hereinbelow, description is given focusing on timings at which the image data after calculation 303 and the backlight control signal 305 are input to the display image data correction unit 308.

First, from the external system (not shown), video data (image data) to be displayed according to screen display, such as color tone or gray scale, is input as the video signal 310 (t0 to t1).

The input video signal 310 is input to the memory for frame rate conversion 306 and the histogram generator 106, respectively.

The input video signal 310 is sequentially stored in the frame memory (not shown) included in the memory for frame rate conversion 306. Next, the video signal 310 stored in the frame memory is output from the memory for frame rate conversion 306 as the comparison frame A 301 and the comparison frame B 302 with a higher frame frequency (120 Hz) than the frame frequency (60 Hz) used when the video signal 310 is input. On this occasion, compared to the input video signal 310, the comparison frame A 301 is output with a delay of a 0.5-frame interval (=0.5 T) (t1 to t2), and the comparison frame B 302 is output with a delay of the one-frame interval (=T) (t2 to t3).

In the interpolation frame generation unit 307 to which the pieces of image data denoted by D0 and D1 have been input based on the input comparison frame A 301 and comparison frame B 302, an interpolation frame, which is an intermediate frame between the comparison frame A 301 and the comparison frame B 302, is generated. In a case where the comparison frame A 301 is D0 and the comparison frame B 302 is D0, the interpolation frame generation unit 307 outputs D0 as the image data after calculation 303 (t2 to t3). In a case where the comparison frame A 301 is D1 and the comparison frame B 302 is D0, the interpolation frame generation unit 307 outputs D0.5 as the image data after calculation 303 representing an interpolation frame between D0 and D1 (t3 to t4). In this manner, compared to the image data D0 corresponding to one frame of the input video signal 310 (for example, t0 to t2), the image data after calculation 303 to be output from the interpolation frame generation unit 307 is output with a delay of the one-frame interval (=T) (for example, t2 to t4). Further, compared to the image data D0, the image data after calculation 303 (denoted by D0.5) representing the interpolation frame between the image data D0 and the image data D1 is output with a delay of a 1.5-frame interval (=1.5 T) (t3 to t4).

Meanwhile, when the image data D0 has been input to the histogram generator 106 (t0), the histogram generator 106 generates the histogram 104 showing the feature amount of the image data D0 based on the image data D0. As described above, the histogram 104 is generated by using image data corresponding to one frame (for example, image data during an interval between t0 and t2), and hence the histogram 104 (denoted by HG0) corresponding to the image data D0 is generated with a delay of the one-frame interval (=T), compared to the image data D0 (t2 to t4).

The backlight brightness calculation unit 309 calculates the light emission brightness of the backlight 111 based on the histogram 104 denoted by HG0, which has been obtained by the histogram generator 106, and then outputs a backlight control signal 305 denoted by BL0 to the display image data correction unit 308 and the backlight 111 (t2 to t4). On this occasion, the backlight control signal 305 denoted by BL0 is output to the display image data correction unit 308 with a delay of one frame (t2 to t4), compared to the originally-input image data D0 (t0 to t2).

Accordingly, to the display image data correction unit 308, with regard to the image data D0 input as the video signal 310, there are input the image data after calculation 303 denoted by D0, which is delayed by the one-frame interval, the image data after calculation 303 denoted by D0.5, which is delayed by the 1.5-frame interval, and the backlight control signal 305 denoted by BL0, which is delayed by the one-frame interval.

With this configuration, the display image data correction unit 308 can correct the image data after calculation 303 denoted by D0 and the image data after calculation 303 denoted by D0.5 based on the backlight control signal 305 denoted by BL0. Here, the image data after calculation 303 denoted by D0.5 is corrected based on the backlight control signal 305 denoted by BL0. However, because the image data after calculation 303 denoted by D0.5 is an interpolation frame between the originally-input image data D0 and the image data D1, there is no problem with correcting the image data after calculation 303 denoted by D0.5 based on the backlight control signal 305 denoted by BL0.

Further, in the intervals after t4, by repeating the above-mentioned operation, the histogram 104 is generated based on the image data input as the video signal 310, and then, the backlight control signal 305 is generated. As a result, it becomes possible to reduce the frame memory for synchronizing the image data after calculation 303 with the backlight control signal 305 in the display image data correction unit 308, enabling synchronization between the image data and the backlight control signal to be realized at low cost.

In the liquid crystal display device according to the first embodiment of the present invention, the histogram 104 for controlling the backlight is generated based on the video signal 310 input to a circuit including the memory for frame rate conversion 306 and the interpolation frame generation unit 307, which is a circuit for implementing the interpolation frame inserting system.

As described above, in the liquid crystal display device according to the first embodiment, the video signal 310, which is image data input from the external system, is temporarily stored in the memory for frame rate conversion 306. The stored image data is then output as the comparison frame A 301 and the comparison frame B 302 with a delay of the interval (=T/2) of half the length of one frame and a delay of the one-frame interval (=T), respectively, with a frame frequency of 120 Hz, which is twice as high as that of the input image data. Accordingly, when it is assumed that the interval (t0 to t2) during which the video signal 310 denoted by D0 is input corresponds to the N-th frame, uncorrected image data (image data after calculation 303) from D0 is to be obtained in the next interval (t2 to t4), which corresponds to the (N+1)-th frame during which the video signal 310 denoted by D1 is to be input.

On the other hand, the histogram generator 106 for generating the histogram 104 based on the video signal 310, which is image data input from the external system, requires image data corresponding to one frame. Accordingly, when it is assumed that the interval (t0 to t2) during which the video signal 310 denoted by D0 is input corresponds to the N-th frame, a histogram to be obtained based on the video signal 310 denoted by D0 is generated in the next interval (t2 to t4), which corresponds to the (N+1)-th frame during which the video signal 310 denoted by D1 is to be input. Then, during the (N+1)-th frame, the backlight control signal 305 is generated based on the video signal 310 denoted by D0, and the amount of light emission from the backlight 111 is controlled.

As described above, in the liquid crystal display device according to the first embodiment, a histogram is directly generated based on a signal input to the memory for frame rate conversion 306, which is a circuit for implementing the interpolation frame inserting system in which it takes the one-frame interval to obtain image data after input of the video signal 310, that is, based on the video signal 310, which is the image data input from the external system. Then, the backlight control signal 305 is calculated. Therefore, it is possible to synchronize control of the amount of light emission, which is obtained based on the image data of the N-th frame, with the image display to be made based on the image data of the N-th frame during the interval of the (N+1)-th frame (t2 to t4).

As a result, it becomes possible to synchronize the image data after calculation 303 with the backlight control signal 305 to perform display while preventing such a circuit as a frame memory from increasing.

[Second Embodiment]

Figure 4A:
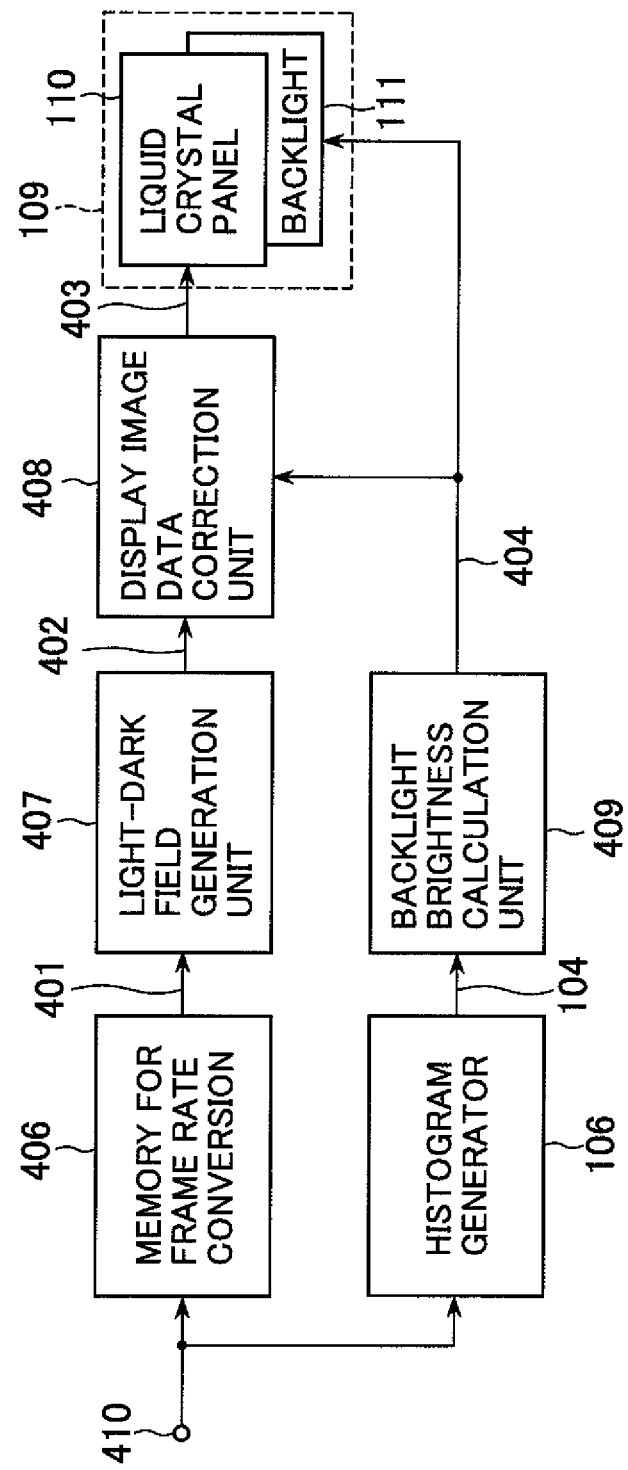
FIG. 4A is a diagram for describing a schematic configuration of a liquid crystal display device, which is one example of a display device according to a second embodiment of the present invention.
Figure 4B:
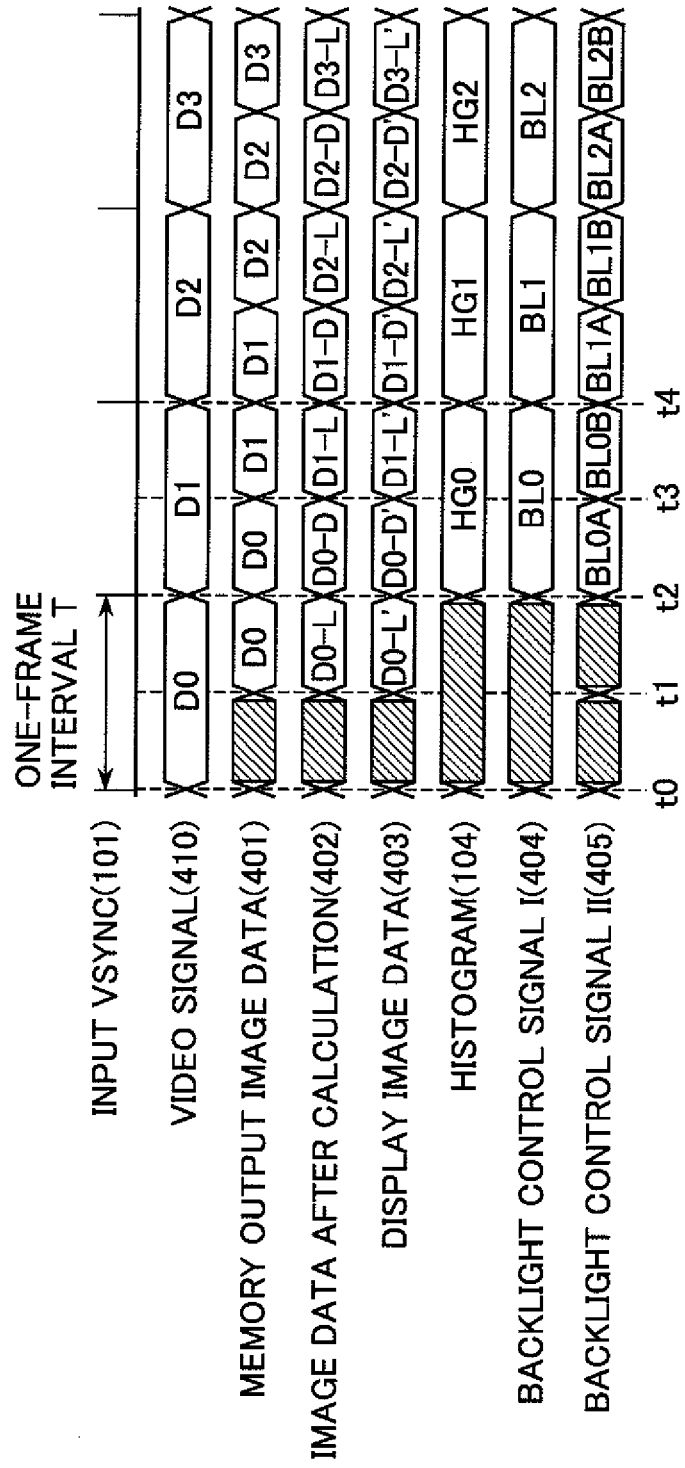
FIG. 4B is an operation chart for describing operation of the liquid crystal display device according to the second embodiment of the present invention.

FIG. 4A is a diagram for describing a schematic configuration of a liquid crystal display device, which is one example of the display device according to a second embodiment of the present invention. In particular, FIG. 4A is a block configuration diagram for describing the schematic configuration of the liquid crystal display device according to the second embodiment of the present invention, whereas FIG. 4B is an operation chart for describing operation of the liquid crystal display device according to the second embodiment of the present invention. The liquid crystal display device according to the second embodiment, which is illustrated in FIG. 4A, is a liquid crystal display device that employs a light-dark field dividing system and a backlight brightness modulating system.

As illustrated in FIG. 4A, the liquid crystal display device according to the second embodiment of the present invention includes a memory for frame rate conversion 406, a light-dark field generation unit 407, a display image data correction unit 408, a histogram generator 106, a backlight brightness calculation unit 409, and an image display unit 109. Further, the image display unit 109 includes a liquid crystal panel (display panel) 110 serving as a light modulation device and a backlight 111 provided behind the liquid crystal panel, which serves as a light source unit.

In FIG. 4A, the memory for frame rate conversion 406 includes a frame memory having a memory capacity for at least one frame. The frame memory may be constructed by any one of an SDRAM, a DRAM, a RAM, a FIFO, and the like, which are all well known. Further, the memory for frame rate conversion 406 of the second embodiment outputs a video signal 410 stored in the frame memory twice in a row with a higher frame frequency than the frame frequency used when the video signal 410 is input. For example, in the memory for frame rate conversion 406 of the second embodiment, the frame frequency used when the video signal 410 is input is 60 Hz, and the frame frequency of memory output image data 401, which is the output of the video signal 410, is 120 Hz. In this manner, the liquid crystal display device according to the second embodiment outputs, as the memory output image data 401, the same image data twice with a frequency twice as high as the frame frequency used when the video signal 410 is input to the memory for frame rate conversion 406, to thereby divide a one-frame interval into two intervals of a first interval (light-field interval) and a second interval (dark-field interval).

Of the same image data that is input twice in a row, based on the image data of the first interval, the light-dark field generation unit 407 generates image data having a larger brightness value than the brightness of the image data of the first interval, that is, generates a brighter image, and then outputs the obtained image data as image data after calculation 402 of the light-field interval. Further, based on the image data of the second interval, the light-dark field generation unit 407 generates image data having a smaller brightness value than the brightness of the image data of the second interval, that is, generates a darker image, and then outputs the obtained image data as image data after calculation 402 of the dark-field interval. Subsequently, this operation is repeated for the image data input in the first and second intervals.

As a result, the pieces of image data after calculation 402 of the light field and the dark field are generated for the same image data, and, by using the pieces of image data after calculation 402 of the two fields, it is possible to obtain the same brightness (visual brightness) as that of the original image data in a simulated manner.

The backlight brightness calculation unit 409 is a circuit for: calculating a backlight control signal 404 for controlling brightness of the backlight 111 based on a histogram 104; controlling a driver circuit (not shown) for the backlight 111 based on the obtained backlight control signal 404; and causing the backlight 111 to emit light with a desired brightness. The backlight brightness calculation unit 409 of the second embodiment also calculates the backlight control signal 404 substantially in real time with input of the histogram 104.

The display image data correction unit 408 is a circuit for generating display image data 403 in consideration of the brightness of the backlight 111 based on the image data after calculation 402 and the backlight control signal 404. Specifically, in a case where an image is bright across the entire screen, the backlight brightness calculation unit 409 causes the backlight 111 to emit backlight with increased brightness based on the histogram. However, in a case where the entire screen is relatively dark, the backlight brightness calculation unit 409 causes the backlight 111 to emit backlight with decreased brightness, which is the same manner as the first embodiment.

Next, with reference to the operation chart illustrated in FIG. 4B, description is given of the operation of the liquid crystal display device according to the second embodiment.

First, from the external system (not shown), image data to be displayed according to screen display, such as color tone or gray scale, is input as the video signal 410 (t0 to t2). The input video signal 410 is subjected to the frame rate conversion by the memory for frame rate conversion 406 (t1 to t3), and then, the light-dark field generation unit 407 generates the light field and the dark field (t1 to t3).

Here, focus is given to image data D0, which is image data corresponding to one frame of the video signal 410. Compared to the input image data D0, image data after calculation 402 denoted by D0–light(D0–L) is delayed by a 0.5-frame interval (=0.5 T) (t1 to t2), and image data after calculation 402 denoted by D0–dark(D0–D) is delayed by the one-frame interval (=T) (t2 to t3), which are then output to the display image data correction unit 408.

Meanwhile, as for the backlight control signal 404, the histogram generator 106 generates a histogram 104 denoted by HG0 based on the input image data D0 (t2 to t4), and, based on the histogram 104 denoted by HG0, the backlight brightness calculation unit 409 calculates a backlight control signal I 404 denoted by BL0 (t2 to t4). Specifically, the backlight control signal I 404 denoted by BL0 is output to the display image data correction unit 408 with a delay of the one-frame interval (=T), compared to the input image data D0 (t2 to t4). In the intervals after t4, the above-mentioned operation is repeated.

Here, the display image data correction unit 408 uses the backlight control signal I 404 denoted by BL0 to correct the image data after calculation 402 denoted by D0–-dark (D0–D) (t2 to t3) and image data after calculation 402 denoted by D1–light (D1–-L) (t3 to t4). In this case, the light field and the dark field are corrected with the same backlight control signal I 404.

It should be noted that the liquid crystal display device of the second embodiment is not limited to the above-mentioned configuration. For example, the following configuration may be employed. That is, by modifying the above-mentioned backlight control signal I 404 into a backlight control signal II 405, a backlight control signal II 405 for the dark field (denoted by BL0A) (t2 to t3) and a backlight control signal II 405 for the light field (denoted by BL0B) (t3 to t4) are calculated based on the histogram 104 denoted by HG0. With this configuration, the image data after calculation 402 denoted by D0–dark (D0–D) can be corrected with the backlight control signal II 405 denoted by BL0A, which is calculated based on the histogram 104 denoted by HG0 (t2 to t3). In this case, the image data after calculation 402 denoted by D1–light (D1–L) is to be corrected with the backlight control signal II 405 denoted by BL0B, which is calculated based on the histogram 104 denoted by HG0. However, compared to the light field, the dark field is more likely to contribute to improvement in power consumption by decreasing backlight brightness to enhance the gray scale of image data. Therefore, it is desirable that the image data after calculation 402 of the dark field is synchronized with the backlight control signal II 405.

As described above, the liquid crystal display device of the second embodiment performs calculation by using the light-dark field dividing system, and then corrects the display image data 403 by using the backlight brightness modulating system. As a result, it becomes possible to reduce the frame memory for synchronizing the image data after calculation 402 with the backlight control signal 404 in the display image data correction unit 408, enabling synchronization between the image data and the backlight control signal to be realized efficiently at low cost.

As described above, in the liquid crystal display device according to the second embodiment, the video signal 410, which is image data input from the external system, is temporarily stored in the memory for frame rate conversion 406. Then, the stored image data is output with a delay of the interval of half the length of one frame (=T/2) with the frame frequency of 120 Hz, which is twice as high as that of the input image data. Accordingly, when it is assumed that the interval (t0 to t2) during which the video signal 410 denoted by D0 is input corresponds to the N-th frame, D0–light(D0–L), which is uncorrected image data from D0, is to be obtained in the interval between t1 and t2, and D0–dark(D0–D) is to be obtained in the interval between t2 and t3. Therefore, D0–dark(D0–D) is to be obtained in the (N+1)-th frame, during which the video signal 410 denoted by D1 is to be input.

On the other hand, the histogram generator 106 for generating the histogram 104 based on the video signal 410, which is image data input from the external system, requires image data corresponding to one frame. Accordingly, when it is assumed that the interval (t0 to t2) during which the video signal 410 denoted by D0 is input corresponds to the N-th frame, a histogram to be obtained based on the video signal 410 denoted by D0 is generated in the next interval (t2 to t4), which corresponds to the (N+1)-th frame during which the video signal 410 denoted by D1 is to be input. Then, during the (N+1)-th frame, the backlight control signal 404 is generated based on the video signal 410 denoted by D0, and the amount of light emission from the backlight 111 is controlled.

As described above, in the liquid crystal display device according to the second embodiment, a histogram is directly generated based on a signal input to the memory for frame rate conversion 406, which is a circuit for implementing the light-dark field dividing system in which it takes half the length (=T/2) of the one-frame interval (=T) to obtain image data after input of the video signal 410, that is, based on the video signal 410, which is the image data input from the external system. Then, the backlight control signal 404 is calculated. Therefore, it is possible to synchronize control of the amount of light emission, which is obtained based on the image data of the N-th frame, with the image display to be made based on the image data of the N-th frame during the interval between t2 and t3 of the (N+1)-th frame.

As a result, it becomes possible to synchronize the image data after calculation 402 with the backlight control signal 404 to perform display while preventing such a circuit as a frame memory from increasing.

It should be noted that the present invention is not limited to the liquid crystal display device according to the first and second embodiments. Considering that a circuit for implementing an interlace-progressive (I-P) conversion system includes a frame memory as well, the present invention is also applicable to a liquid crystal display device using the I-P conversion system.

As described above, when the display device according to the first embodiment of the present invention displays the image data of an interpolation frame generated based on the image data of the N-th frame of the input video signal and the image data of the (N+1)-th frame thereof, and the image data obtained by subjecting the image data of the N-th frame of the input video signal to the frame rate conversion, display is performed using the backlight control signal calculated based on a histogram generated from the image data of the N-th frame, which is the same frame as the input video signal that has been input to the memory for frame rate conversion.

On this occasion, the backlight of the (N+1)-th frame is controlled according to light emission amount control based on the histogram obtained from the image data of the N-th frame. Meanwhile, the image display of the (N+1)-th frame on the liquid crystal panel is also based on the image data of the N-th frame.

As a result, it becomes possible to synchronize the image data with the backlight control signal to perform display while preventing such a circuit as a frame memory from increasing.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
a display panel serving as a light modulation device;
a backlight provided behind the display panel, for emitting irradiation light;
a memory for frame rate conversion for outputting a video signal, which is subjected to frame rate conversion, with a higher frequency than a frequency of an input video signal input from an external system;
an interpolation frame generation unit for generating an interpolation frame based on the video signal which is subjected to the frame rate conversion, and outputting a video signal into which the interpolation frame is inserted;
a histogram generator for generating a histogram based on the input video signal; and
a backlight brightness calculation unit for calculating a backlight control signal for adjusting brightness of the backlight based on the histogram, the display device further comprising:
wherein image data for display is input to the display panel,
wherein the backlight control signal is input to the backlight, wherein the image data for display is obtained by subjecting image data of an N-th frame of the input video signal to the frame rate conversion, and image data of the interpolation frame generated based on the image data of the N-th frame and image data of an (N+1)-th frame of the input video signal, where N represents a natural number including zero; and
wherein the backlight control signal calculated based on the histogram generated based on the image data of the N-th frame is used for displaying the image data for display, and
wherein the display device comprises a display image data correction unit, coupled to the interpolation frame generation unit, the backlight brightness calculation unit and the display panel, for correcting the video signal output from the interpolation frame generation unit, into which the interpolation frame is inserted, based on the backlight control signal output from the backlight brightness calculation unit, and for outputting the image data, after correction, to the display panel for display.

2. A display device according to claim 1, wherein the histogram generator generates the histogram based on an input video signal of the same frame interval as the input video signal input to the memory for frame rate conversion.

3. A display device according to claim 1, wherein, during each of two frame intervals for the image data for display, the backlight control signal for displaying the image data for display is obtained based on the same histogram.

4. A display device according to claim 1, wherein the same backlight control signal is used continuously for two frames of the image data for display.

5. A display device according to claim 1, wherein the display panel is a liquid crystal display panel which has a plurality of pixels arranged in matrix, and which has a first substrate and a second substrate arranged facing each other through an intermediation of a liquid crystal layer.

6. A display device, comprising:
a display panel serving as a light modulation device;
a backlight provided behind the display panel, for emitting irradiation light;
a memory for frame rate conversion for outputting a video signal, which is subjected to frame rate conversion, with a higher frequency than a frequency of an input video signal input from an external system;
a light-dark field generation unit for generating a light field and a dark field based on the video signal which is subjected to the frame rate conversion, and outputting a video signal containing the light field and the dark field;
a histogram generator for generating a histogram based on the input video signal; and
a backlight brightness calculation unit for calculating a backlight control signal for adjusting brightness of the backlight based on the histogram, the display device further comprising:
wherein image data for display is input to the display panel,
wherein the backlight control signal is input to the backlight,
wherein the image data for display is obtained by image data of the dark field generated based on image data of an N-th frame of the input video signal, and image data of the light field generated based on image data of an (N+1)-th frame of the input video signal; and
wherein the backlight control signal calculated based on the histogram generated based on the image data of the N-th frame is used for displaying the image data for display,
wherein the display device comprises a display image data correction unit, coupled to the light-dark field generation unit, the backlight brightness calculation unit and the display panel, for correcting the video signal output from the light-dark field generation unit and containing the light field and the dark field, based on the backlight control signal output from the backlight brightness calculation unit, and for outputting the image data, after correction, to the display panel for display.

7. A display device according to claim 6, wherein the histogram generator generates the histogram based on an input video signal of the same frame interval as the input video signal input to the memory for frame rate conversion.

8. A display device according to claim 6, wherein, during each of two frame intervals for the image data for display, the backlight control signal for displaying the image data for display is obtained based on the same histogram.

9. A display device according to claim 6, wherein the same backlight control signal is used continuously for two frame intervals of the image data for display.

10. A display device according to claim 6, wherein, based on the histogram generated by using data corresponding to one frame of the input video signal, the backlight control signal for the light field and the backlight control signal for the dark field are calculated.

11. A display device for performing display with gray scale and brightness according to image data input from an external system, the display device comprising:
a display panel comprising a plurality of pixels arranged in matrix;
a backlight for emitting irradiation light to a back side of the display panel;
a memory for storing the image data corresponding to at least one frame, which is input from the external system;
a generation unit for generating image data having a different value from the image data; and
a light emission amount calculation unit for calculating a light emission amount of the backlight based on the image data, wherein:
the image data is written into the memory once during a one-frame interval, and the image data is read out from the memory twice with a delay of at least half a length of the one-frame interval after the image data is written;

the generation unit uses first image data read out from the memory for a first time and second image data read out from the memory for a second time, to generate first image data for display and second image data for display corresponding to the first image data and the second image data, respectively;

the light emission amount calculation unit calculates the light emission amount of the backlight based on the image data input from the external system; and displaying of the first image data for display and the second image data for display on the display panel and irradiation made by the backlight with the calculated light emission amount are performed in synchronization with a frame interval of the image data input from the external system, further comprising a display image data correction unit, coupled to the generation unit, the light emission amount calculation unit and the display panel, for correcting the first image data and second image data for display, which are output from the generation unit, based on the light emission amount of the backlight, which is output from the light emission amount calculation unit, and for outputting the first image data and the second image data, after correction, to the display panel for display.

12. A display device according to claim 11, further comprising a histogram generator for generating a histogram based on the image data input from the external system, wherein the light emission amount calculation unit calculates the light emission amount of the backlight based on the histogram.

* * * * *